United States Patent
Sakamoto

(10) Patent No.: US 7,831,149 B2
(45) Date of Patent: Nov. 9, 2010

(54) OPTICAL TRANSMISSION DEVICE

(75) Inventor: Takeshi Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 559 days.

(21) Appl. No.: 11/892,143

(22) Filed: Aug. 20, 2007

(65) Prior Publication Data

US 2008/0095537 A1     Apr. 24, 2008

(30) Foreign Application Priority Data

Oct. 19, 2006   (JP)   ............................. 2006-285081

(51) Int. Cl.
*H04J 14/02* (2006.01)

(52) U.S. Cl. ...................................... 398/83

(58) Field of Classification Search ................ 398/1–7, 398/83–85
See application file for complete search history.

(56) References Cited

U.S. PATENT DOCUMENTS

| 7,039,272 | B2 | 5/2006 | Uda |
| 7,650,072 | B2 * | 1/2010 | Onaka et al. .................. 398/25 |

FOREIGN PATENT DOCUMENTS

JP      2007-067944      3/2007

OTHER PUBLICATIONS

Patent Abstract of Japan, Japanese Publication No. 2007-067944, Published Mar. 15, 2007.

* cited by examiner

*Primary Examiner*—Leslie Pascal
(74) *Attorney, Agent, or Firm*—Fujitsu Patent Center

(57) ABSTRACT

An optical transmission device capable of preventing deterioration in the transmission quality of a signal beam. A wavelength-multiplexed signal beam from a transmission path is split by a splitter, and the split signal beams are input to first and second optical paths, respectively. An add/drop unit for adding/dropping a wavelength-multiplexed signal beam is removably insertable in the second optical path. A switch outputs the wavelength-multiplexed signal beam, received from one of the first and second optical paths, to an optical amplifier. The optical amplifier amplifies the wavelength-multiplexed signal beam output from the switch and outputs the amplified signal beam to a subsequent circuit. A supervisory controller collects alarm information from the optical transmission device as well as from other optical transmission devices, and controls the switch in accordance with the collected alarm information such that the wavelength-multiplexed signal beam from the second optical path is input to the optical amplifier.

20 Claims, 12 Drawing Sheets

OPTICAL TRANSMISSION DEVICE

CROSS-REFERENCE TO RELATED APPLICATIONS

This application is based upon and claims the benefits of priority from the prior Japanese Patent Application No. 2006-285081, filed on Oct. 19, 2006, the entire contents of which are incorporated herein by reference.

BACKGROUND OF THE INVENTION

1. Field of the Invention

The present invention relates to optical transmission devices, and more particularly, to an optical transmission device for transmitting a wavelength-multiplexed signal beam.

2. Description of the Related Art

It is sometimes the case that when an optical transmission system is constructed in a certain area, there is no demand for communications at first and that as a result of subsequent development of the area, the demand for communications rapidly increases. To meet such a varying demand for communications, there has been proposed a method in which an optical transmission device with add/drop function is installed in an area so that the add/drop function may be enabled when the demand for communications rises (see, e.g., Unexamined Japanese Patent Publication No. 2004-297235).

Also, an optical transmission device is known which has no optical wavelength add/drop function (add/drop unit) at first, in order to reduce costs, and an add/drop unit is added as needed after the service is started. When the configuration of the optical transmission device is changed by adding the add/drop unit thereto, it is necessary that the time of signal interruption should be minimized (to about 50 ms). Accordingly, an optical switch or the like is arranged in the route from the add/drop unit to be added so that the add/drop function can be activated in a moment.

FIG. 12 is a block diagram of an optical transmission device to which an add/drop unit is additionally attached. As illustrated, the optical transmission device has a coupler 101, an add/drop unit 102, and an optical switch 103.

The coupler 101 splits a WDM (Wavelength Division Multiplexing) signal beam received from an optical network and outputs the split signal beams to optical paths A101 and A102, respectively. The optical switch 103 outputs the signal beam, received from either the optical path A101 or A102, to a subsequent stage. The add/drop unit 102 is capable of adding/dropping a signal beam and is removably inserted in the optical path A101.

Where it is unnecessary to add/drop a signal beam, the add/drop unit 102 is detached from the optical transmission device. In this case, the optical switch 103 is controlled such that the signal beam from the optical path A102 is output to the subsequent stage.

If the need to add/drop a signal beam arises after the provision of service by the optical transmission device is started, the add/drop unit 102 is inserted in the optical path A101, as illustrated in FIG. 12. In this case, the optical switch 103 is controlled such that the signal beam from the add/drop unit 102 is output to the subsequent stage.

In this manner, after the add/drop unit 102 is attached to the optical transmission device, the optical switch 103 switches the path from the optical path A102 to the optical path A101, whereupon the configuration of the optical transmission device is instantly switched from ILA (In-Line Amplifier) configuration to OADM (Optical Add/Drop Multiplexer) configuration, thus shortening the signal interruption time. The ILA configuration denotes the configuration of the optical transmission device without the add/drop unit 102, and the OADM configuration denotes the configuration equipped with the add/drop unit 102.

When the optical transmission device is switched from the ILA to the OADM configuration, however, the transmission quality of the signal beam lowers, depending on the state of this optical transmission device or the states of other optical transmission devices which constitute the same network and of which the configuration is not switched.

In FIG. 12, for example, if the configuration of the optical transmission device is switched even though the add/drop unit 102 is anomalous, signal interruption occurs, lowering the transmission quality. Also, if the configuration of the optical transmission device is switched while signal degradation is caused in the add/drop unit of a different optical transmission device whose configuration is not switched, the transmission quality lowers.

SUMMARY OF THE INVENTION

The present invention was created in view of the above circumstances, and an object thereof is to provide an optical transmission device which collects alarm information of its own as well as those of other optical transmission devices and of which the configuration is switched in accordance with the collected alarm information, thereby preventing deterioration in transmission quality.

To achieve the object, there is provided an optical transmission device for transmitting a wavelength-multiplexed signal beam. The optical transmission device comprises a first optical path, a second optical path in which an add/drop unit for adding/dropping a wavelength-multiplexed signal beam is removably insertable, a splitter for splitting a wavelength-multiplexed signal beam received from a transmission path and outputting the split signal beams to the first and second optical paths, respectively, a switch for outputting the wavelength-multiplexed signal beam, received from one of the first and second optical paths, to an optical amplifier, and a supervisory controller for collecting alarm information from the optical transmission device as well as from a different optical transmission device and controlling the switch in accordance with the alarm information such that the wavelength-multiplexed signal beam from the second optical path is input to the optical amplifier.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The principles of the present invention will be described in detail below with reference to the accompanying drawings.

Figure 1:
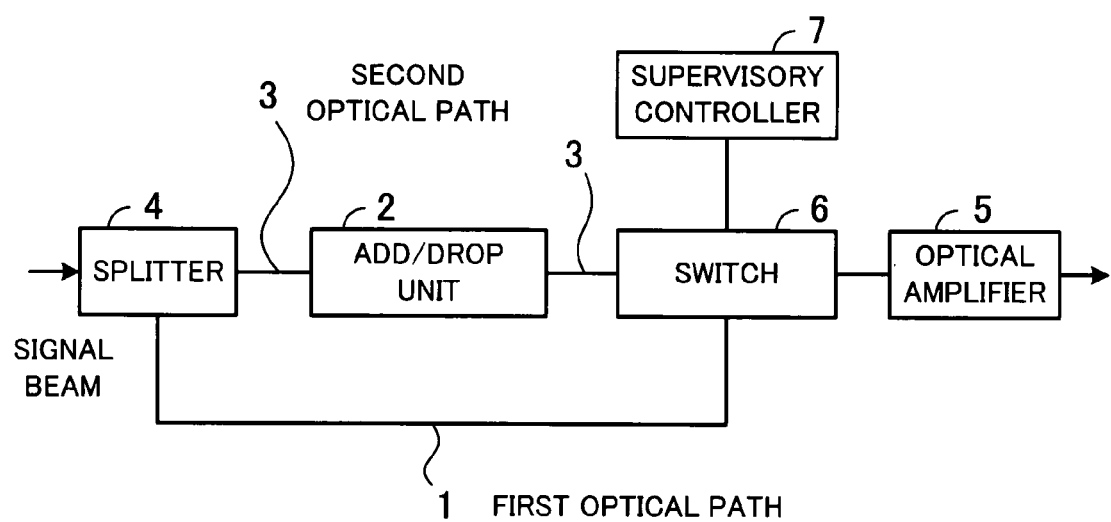
FIG. 1 schematically shows an optical transmission device.

FIG. 1 schematically shows an optical transmission device. As illustrated, the optical transmission device includes a first optical path 1, an add/drop unit 2, a second optical path 3, a splitter 4, an optical amplifier 5, a switch 6, and a supervisory controller 7.

The splitter 4 splits a wavelength-multiplexed signal beam received from a transmission path and outputs the split signal beams to the first and second optical paths 1 and 3, respectively.

Thus, the wavelength-multiplexed signal beams split by the splitter 4 enter the respective first and second optical paths 1 and 3.

The add/drop unit 2 is capable of adding/dropping a wavelength-multiplexed signal beam and is removably inserted in the second optical path 3.

The switch 6 outputs the wavelength-multiplexed signal beam, received from one of the first and second optical paths 1 and 3, to the optical amplifier 5.

The optical amplifier 5 amplifies the wavelength-multiplexed signal beam output from the switch 6 and outputs the amplified signal beam to a subsequent circuit.

The supervisory controller 7 collects alarm information from this optical transmission device as well as from other optical transmission devices and controls the switch 6 in accordance with the alarm information such that the wavelength-multiplexed signal beam from the second optical path 3 is input to the optical amplifier 5.

For example, where the optical transmission device has no add/drop function at first and the add/drop function is thereafter required, the add/drop unit 2 is inserted in the second optical path 3 and the switch 6 is controlled such that the wavelength-multiplexed signal beam from the second optical path 3 is input to the optical amplifier 5. At this time, the supervisory controller 7 collects alarm information from this and other optical transmission devices and controls the switch 6 in accordance with the collected alarm information.

Specifically, the alarm information collected by the supervisory controller 7 includes information indicating whether the add/drop unit 2 of the local optical transmission device is properly outputting a wavelength-multiplexed signal beam, and information indicating whether signal degradation is being caused in the add/drop units of other optical transmission devices. If the add/drop unit 2 is properly outputting a wavelength-multiplexed signal beam and also no signal degradation is being caused in the add/drop units of the other optical transmission devices, the supervisory controller 7 controls the switch 6 such that the wavelength-multiplexed signal beam from the second optical path 3 is input to the optical amplifier 5.

In this manner, the alarm information is collected from the local optical transmission device as well as from other optical transmission devices, and the switch 6 is switched in accordance with the collected alarm information, whereby communication with low transmission quality can be prevented.

Preferred embodiments of the present invention will be now described in detail with reference to the drawings.

Figure 2:
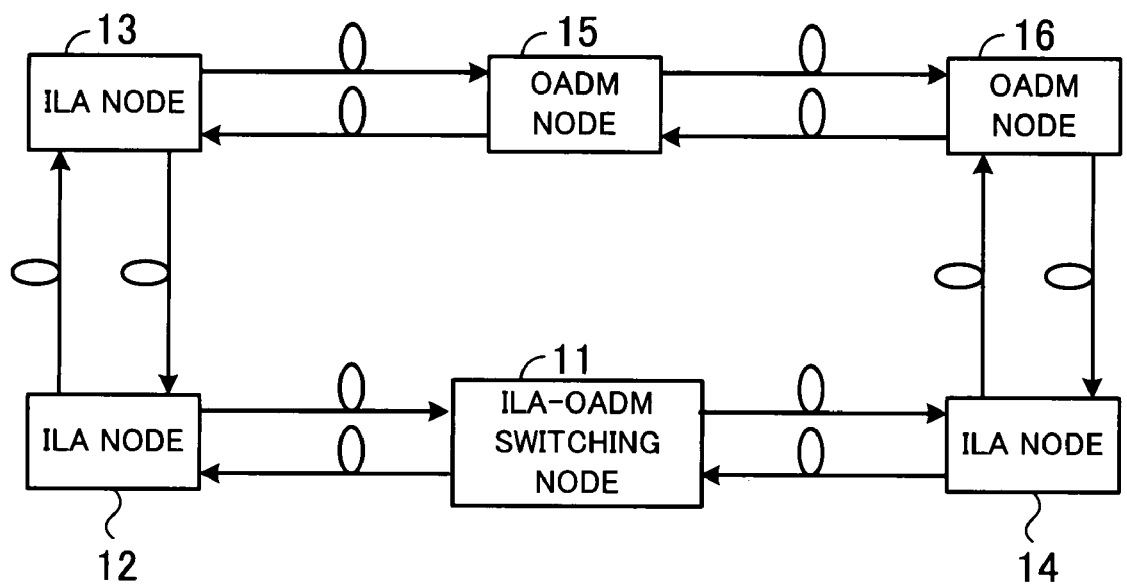
FIG. 2 shows an exemplary configuration of a network to which the optical transmission device is applied.

FIG. 2 shows an exemplary configuration of a network to which the optical transmission device is applied. As illustrated, the network includes an optical transmission device (ILA-OADM switching node) 11 capable of switchover between ILA and OADM configurations, optical transmission devices (ILA nodes) 12 to 14 each having the ILA configuration only, and optical transmission devices (OADM nodes) 15 and 16 each having the OADM configuration only. The ILA-OADM switching node 11, the ILA nodes 12 to 14 and the OADM nodes 15 and 16 are connected by optical fibers to constitute a ring network. The form of network to which the ILA-OADM switching node 11 is applied is not limited to ring network but may be Point-to-Point network.

The configuration of the ILA-OADM switching node 11 shown in FIG. 2 will be now described.

Figure 3:
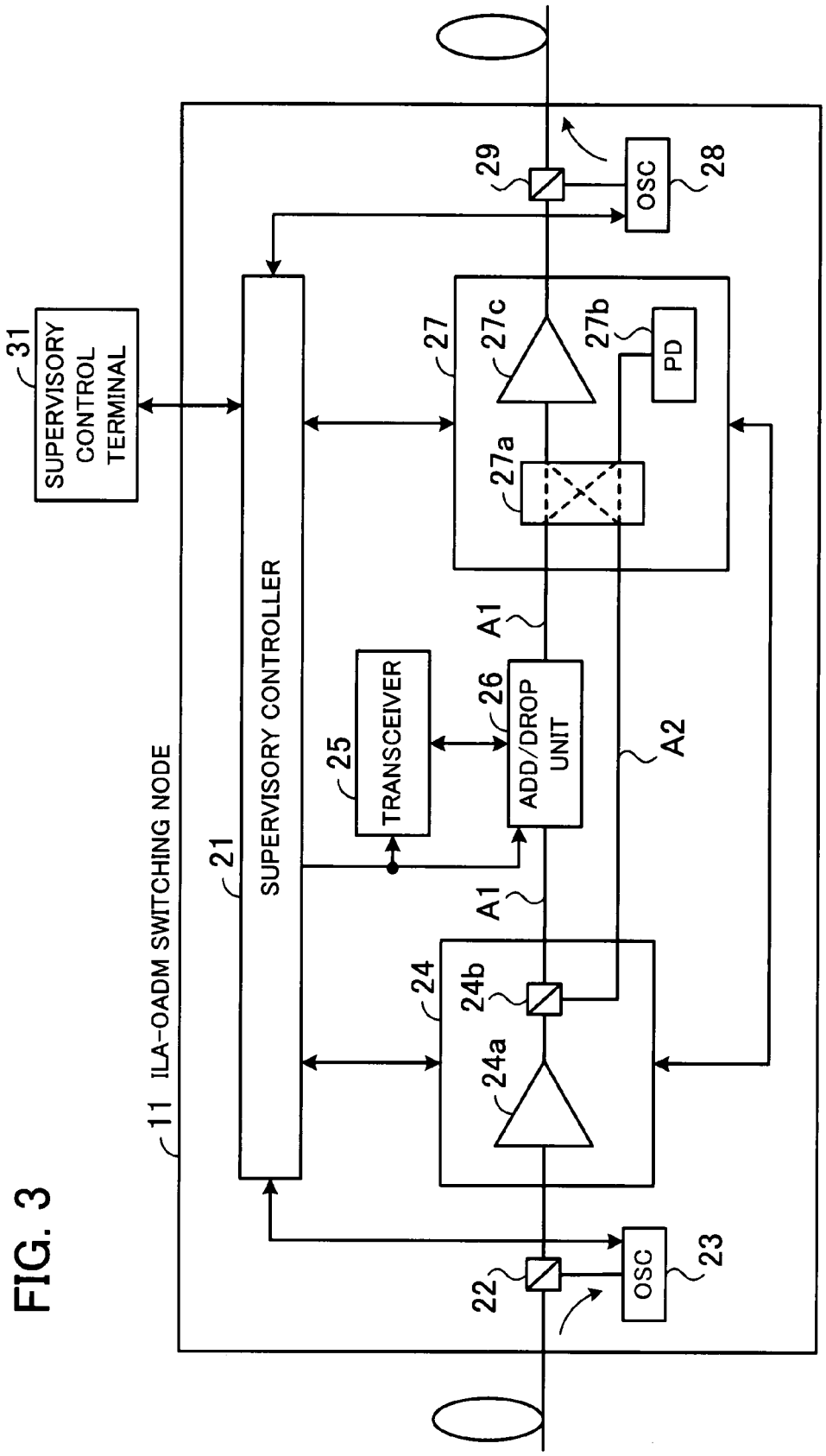
FIG. 3 is a block diagram of an ILA-OADM switching node.

FIG. 3 is a block diagram of the ILA-OADM switching node. The ILA-OADM switching node 11 includes a supervisory controller 21, couplers 22 and 29, OSCs (Optical Supervisory Channels) 23 and 28, a preamplifier 24, a transceiver 25, an add/drop unit 26, and a post-amplifier 27. The figure also shows a supervisory control terminal 31 for supervising the ILA-OADM switching node 11.

In accordance with instructions received from the supervisory control terminal 31, the supervisory controller 21 supervises the ILA-OADM switching node 11. Also, the supervisory controller 21 receives, from the OSC 23, information about the states of the transmission path and other nodes, and outputs, to the OSC 28, information about the states of the transmission path and other nodes as well as the state of the local node 11. Further, the supervisory controller 21 exchanges information with the transceiver 25, the attached add/drop unit 26, the preamplifier 24 and the post-amplifier 27 to control these elements.

The coupler 22 splits a signal beam received from the transmission path and outputs the split signal beams to the OSC 23 and the preamplifier 24, respectively.

The OSC 23 extracts a supervisory control signal (OSC) included in the signal beam received from the transmission path, to acquire information about the transmission path and other nodes, in-service channel information included in the WDM signal beam, etc. The OSC 23 outputs the acquired information to the supervisory controller 21.

The preamplifier 24 has an optical amplifier 24*a* and a coupler 24*b*. The optical amplifier 24*a* operates under the control of the supervisory controller 21 to amplify the signal beam, of which the level has lowered due to the propagation over the transmission path, up to a predetermined optical level. Also, under the control of the supervisory controller 21, the optical amplifier 24*a* performs control actions such as ALC (Automatic Level Control) and AGC (Automatic Gain Control). The coupler 24*b* splits the signal beam output from the optical amplifier 24*a* and outputs the split signal beams to optical paths A1 and A2, respectively, constituted by optical fibers.

The transceiver 25 receives a signal from a different network, subjects the received signal to E/O (Electric/Optical) conversion, and outputs the resulting signal to the add/drop unit 26. Also, the transceiver subjects the signal output from the add/drop unit 26 to O/E conversion and transmits the resulting signal to the different network.

The add/drop unit 26 is removably inserted in the optical path A1 to add/drop a signal beam.

Figure 4:
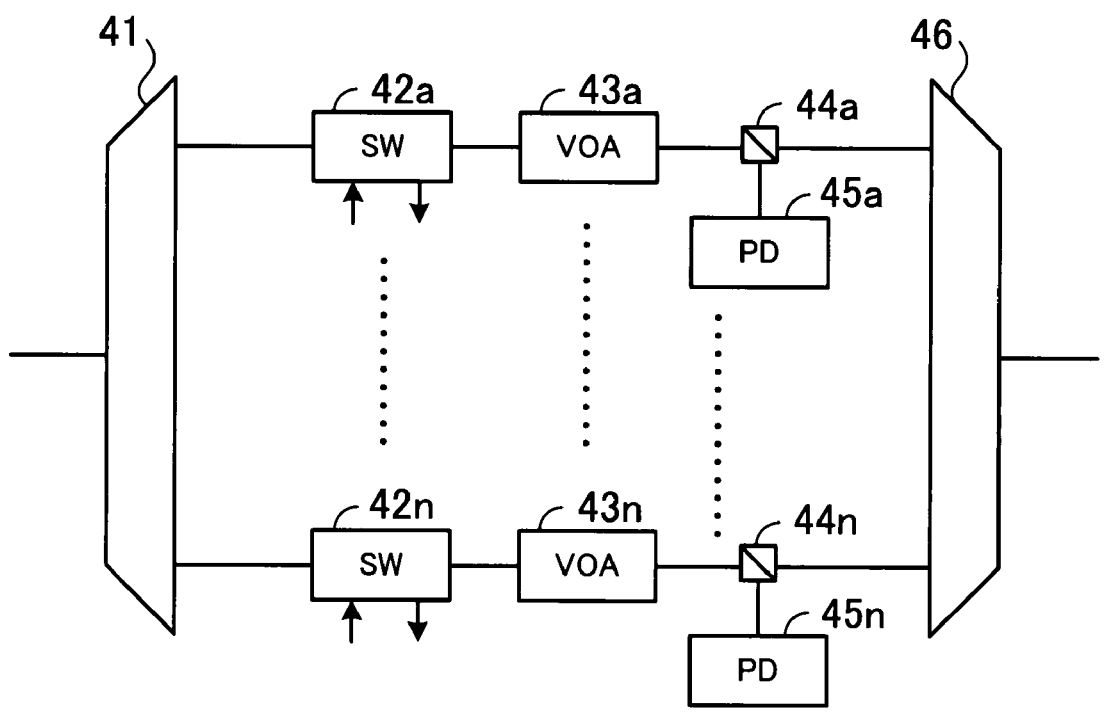
FIG. 4 is a block diagram of an add/drop unit.

FIG. 4 is a block diagram of the add/drop unit. As illustrated, the add/drop unit 26 includes a demultiplexer 41, optical switches (in the figure, indicated by "SW") 42a to 42n, VOAs (Variable Optical Attenuators) 43a to 43n, couplers 44a to 44n, photodiodes (in the figure, indicated by "PD") 45a to 45n, and a multiplexer 46.

The demultiplexer 41 demultiplexes the WDM signal beam output from the preamplifier 24 into signal beams of respective channels.

The optical switches 42a to 42n perform signal switching by adding/dropping signal beams.

The VOAs 43a to 43n control the respective signal beams to be output to the multiplexer 46 so that their optical levels may become equal to a predetermined level.

Each of the couplers 44a to 44n splits the signal beam output from a corresponding one of the VOAs 43a to 43n into two signal beams, one being output to a corresponding one of the photodiodes 45a to 45n and the other being output to the multiplexer 46.

The photodiodes 45a to 45n monitor the optical levels of the signal beams output from the respective VOAs 43a to 43n. In accordance with the optical levels monitored by the photodiodes 45a to 45n, the VOAs 43a to 43n control the signal beams output from the respective optical switches 42a to 42n so that their optical levels may become equal to the predetermined level.

The multiplexer 46 multiplexes the signal beams of the respective channels and outputs the multiplexed signal beam to the post-amplifier 27.

Referring again to FIG. 3, the post-amplifier 27 has an optical switch 27a, a photodiode 27b, and an optical amplifier 27c.

The optical switch 27a is a 2×2 optical switch having inputs connected to the optical paths A1 and A2 and having outputs connected to the optical amplifier 27c and the photodiode 27b. The optical switch 27a operates under the control of the supervisory controller 21 to output the signal beam received from the add/drop unit 26 (optical path A1) to the optical amplifier 27c or the photodiode 27b and to output the signal beam received from the coupler 24b (optical path A2) to the optical amplifier 27c or the photodiode 27b.

The photodiode 27b detects the optical level of the signal beam output from the optical switch 27a. When the optical switch 27a is operated such that the signal beam from the add/drop unit 26 is output to the photodiode 27b and that the signal beam from the coupler 24b is output to the optical amplifier 27c, the photodiode 27b can detect the optical level of the signal beam output from the add/drop unit 26. On the other hand, when the optical switch 27a is operated such that the signal beam from the coupler 24b is output to the photodiode 27b and that the signal beam from the add/drop unit 26 is output to the optical amplifier 27c, the photodiode 27b can detect the optical level of the signal beam output from the coupler 24b.

The optical amplifier 27c operates under the control of the supervisory controller 21 to amplify the signal beam output from the optical switch 27a up to an optical level high enough to be transmitted over the transmission path. Also, under the control of the supervisory controller 21, the optical amplifier 27c performs control actions such as ALC and AGC.

The OSC 28 operates under the control of the supervisory controller 21 to include, in the supervisory control signal, information about the transmission path as well as the local and other nodes, in-service channel information included in the WDM signal beam, etc. The OSC 28 outputs the supervisory control signal to the coupler 29.

The coupler 29 couples the supervisory control signal output from the OSC 28 with the signal beam output from the post-amplifier 27, and outputs the resulting signal beam to the transmission path.

Optical loss differs substantially depending on whether the signal beam is passed along the route (optical path A1) including the add/drop unit 26 or the route (optical path A2) not including the add/drop unit. Accordingly, an optical attenuator may be inserted into the optical path A2 so as to reduce the difference between the optical levels input to the optical amplifier 27c before and after the switchover of the optical switch 27a. Alternatively, the split ratio of the coupler 24b may be so set that the signal beam input to the optical path A2 may have a lower optical level, thereby reducing the difference between the optical levels input to the optical amplifier 27c before and after the switchover of the optical switch 27a.

Figure 12:
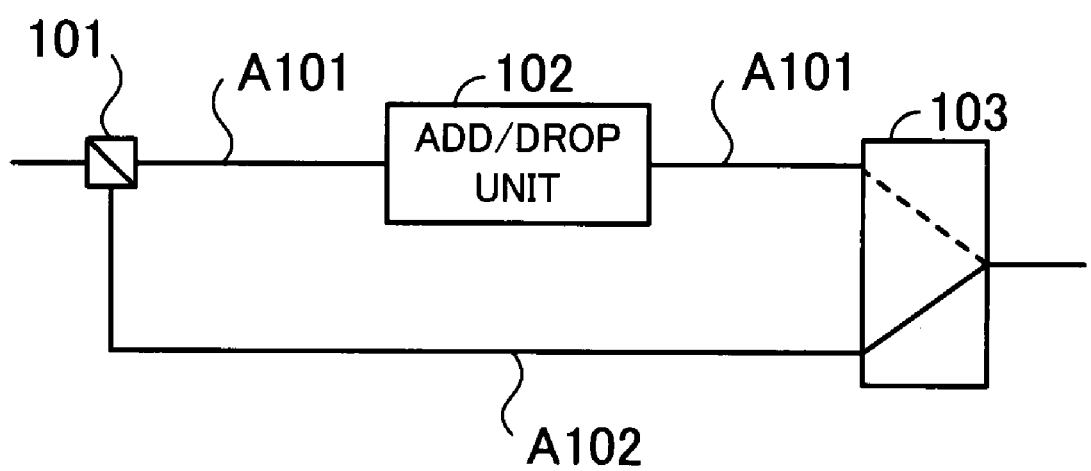
FIG. 12 is a block diagram of an optical transmission device to which an add/drop unit is additionally attached.

Problems that can arise when the optical transmission device shown in FIG. 12 is switched from the ILA to the OADM configuration will be explained in detail, before proceeding to brief description of the operation of the ILA-OADM switching node 11 shown in FIG. 3. At the time of switchover from the ILA to the OADM configuration, the problems explained below can arise due to, for example, difference between the control methods applied to the ILA and OADM configurations.

Figure 5A:
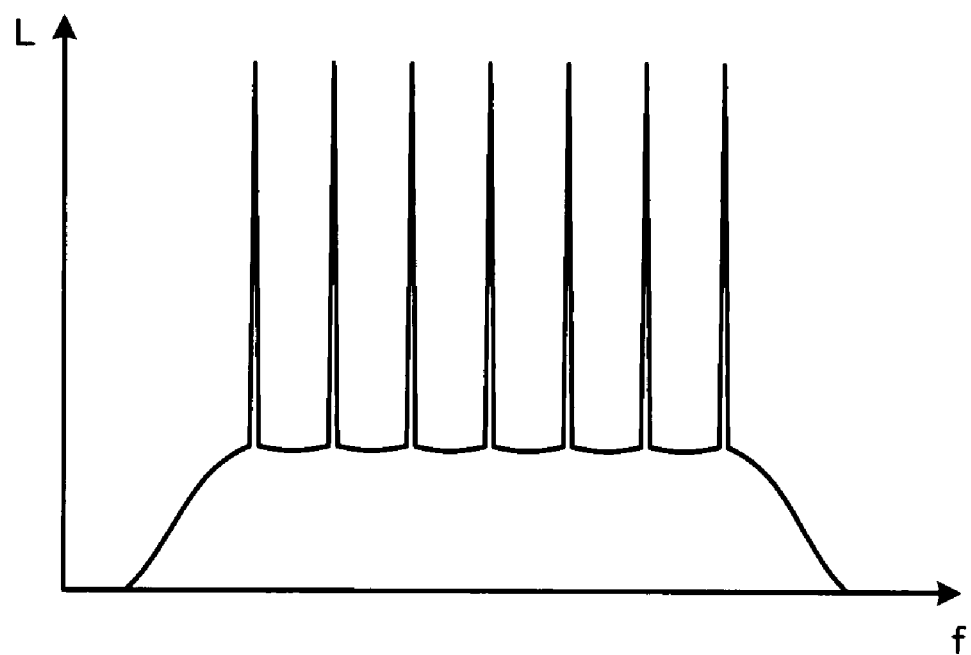
FIGS. 5A and 5B illustrate ASE levels in front of and behind the add/drop unit.
Figure 5B:
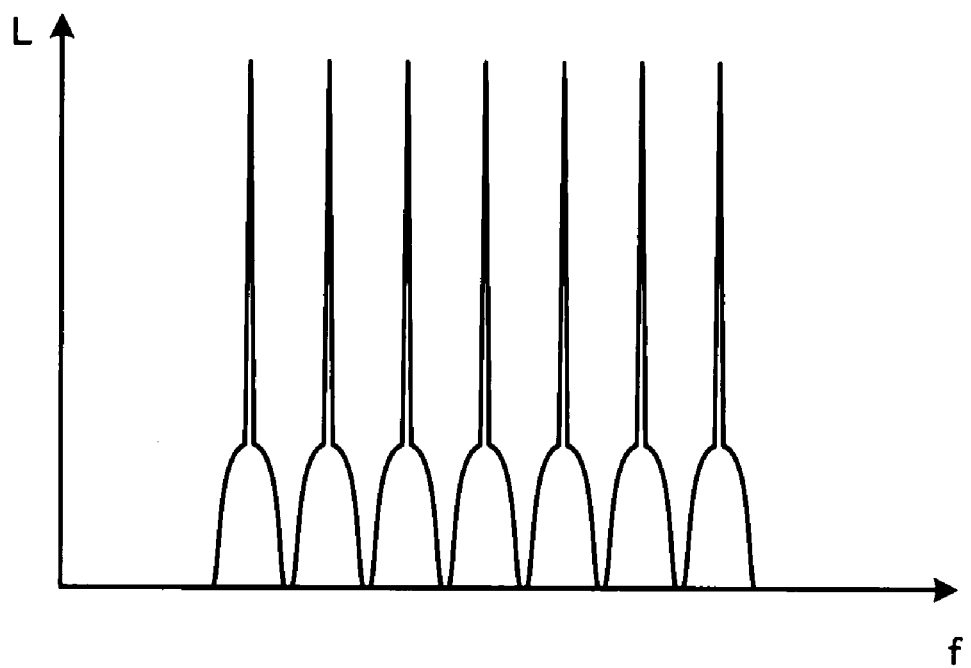

1. Deterioration in transmission quality attributable to change in cumulative ASE (Amplified Spontaneous Emission). FIGS. 5A and 5B illustrate ASE levels in front of and behind the add/drop unit, wherein FIG. 5A shows a signal beam level in front of the add/drop unit 102 shown in FIG. 12, and FIG. 5B shows a signal beam level behind the add/drop unit 102. As seen from FIGS. 5A and 5B, the add/drop unit 102 lowers the ASE level between the wavelengths of the signal beam. Namely, at the time of switchover from the ILA to the OADM configuration, the ASE level contained in the signal beam varies.

An optical amplifier amplifies the whole of a signal beam. Accordingly, if, after the insertion of the add/drop unit 102, the optical amplifier succeeding the add/drop unit 102 amplifies the signal beam with the same gain as that applied before the add/drop unit 102 is inserted, the optical level of the signal beam increases because the ratio of the signal beam level to the ASE level is greater. Namely, at the time of switchover from the ILA to the OADM configuration, the optical level of the signal beam varies due to change of the ASE level, deteriorating transmission quality.

2. Transmission quality deterioration by shifting of disconnection detection threshold attributable to change in cumulative ASE. In an optical transmission device, the optical level of the signal beam is monitored to detect disconnection of the optical fiber. Thus, when switchover from the ILA to the OADM configuration is performed in an optical transmission device (reconfigurable optical transmission device shown in FIG. 12) that precedes a certain optical transmission device, the latter optical transmission device may erroneously detect disconnection of the optical fiber since the optical level of the signal beam varies due to change of the ASE level. Namely, the switchover of an optical transmission device from the ILA to the OADM configuration causes shifting of the disconnection detection thresholds of the downstream optical transmission devices.

3. Transmission quality deterioration due to change in optical level of signal beam. At the time of switchover from the ILA to the OADM configuration, the optical level of the signal beam varies, as mentioned above. In general, an optical amplifier is arranged at the stage subsequent to the add/drop unit 102, in order to increase the optical level, which has been dropped by the add/drop unit 102, and to keep the optical level constant. The optical level of the signal beam input to the optical amplifier should desirably be constant, and if the signal beam level varies, the transmission quality deteriorates. Also, if the switchover of configuration is executed while signal degradation is caused in the add/drop unit of a different optical transmission device of which the configuration is not switched, the transmission quality further lowers.

4. Transmission quality deterioration due to error in ALC control caused by sudden change in the number of wavelengths. At the time of switchover from the ILA to the OADM configuration, the number of wavelengths can suddenly change, depending on the number of signals added/dropped by the add/drop unit 102. The optical amplifier succeeding the add/drop unit 102 controls the optical level of the signal beam so as to be constant, but if the number of wavelengths of the signal beam changes, the optical level output from the optical amplifier varies. Namely, change in the number of wavelengths of the signal beam accompanying the switchover from the ILA to the OADM configuration causes deterioration in the transmission quality.

5. Transmission quality deterioration caused by operation of OUPSR (Optical Unidirectional Path Switched Ring) or span switch (transmission path redundancy) in response to momentary interruption. At the time of switchover from the ILA to the OADM configuration, an interruption of the signal beam, though short in time, takes place. In this case, an optical transmission device receiving the signal beam from the optical transmission device whose configuration is switched may erroneously recognize that the optical fiber has been disconnected, for example, with the result that the switch of the OUPSR is switched from EAST to WEST. Namely, even if the configuration of the optical transmission device is switched in a short time, an optical transmission device receiving the signal beam from this device may erroneously operate the switch of the OUPSR, prolonging the signal interruption due to the switchover of the OUPSR.

6. Erroneous generation of disconnection alarm in response to momentary interruption. At the time of switchover from the ILA to the OADM configuration, an interruption of the signal beam, though short in time, takes place. In this case, although the optical fiber is in actuality not disconnected, other optical transmission devices may erroneously generate an alarm warning disconnection of the optical fiber, for example, in response to a momentary interruption caused by the switchover of configuration.

7. Signal interruption due to failure of the add/drop unit. If switchover from the ILA to the OADM configuration is executed despite failure of the add/drop unit 102, the signal beam is no longer output to the subsequent stages.

The operation of the ILA-OADM switching node 11 shown in FIG. 3 will be now described. When using the ILA-OADM switching node 11 in the ILA configuration mode, the add/drop unit 26 is not attached to the ILA-OADM switching node 11. Accordingly, the supervisory controller 21 controls the optical switch 27a such that the signal beams from the optical paths A2 and A1 are output to the optical amplifier 27c and the photodiode 27b, respectively.

When using the ILA-OADM switching node 11 in the OADM configuration mode, the add/drop unit 26 is inserted in the optical path A1. Then, using the supervisory control terminal 31, the operator sends a switchover request to the ILA-OADM switching node 11. In response to the switchover request from the supervisory control terminal 31, the supervisory controller 21 of the ILA-OADM switching node switches the optical switch 27a.

Before switching the optical switch 27a, however, the supervisory controller 21 checks, by means of the photodiode 27b, the optical level of the signal beam output from the attached add/drop unit 26. By switching the optical switch 27a after checking the optical level of the signal beam output from the add/drop unit 26, it is possible to detect a level change of the signal beam caused by the switchover from the ILA to the OADM configuration. It is also possible to ensure that the add/drop unit 26 is operating without failure, thus preventing the signal beam from ceasing to be output to the subsequent stage (the problem mentioned in the first half of paragraph 3 and the problems mentioned in paragraphs 4 and 7 can be solved).

Also, before switching the optical switch 27a, the supervisory controller 21 collects, from the OSC 23, alarm information about the transmission paths and individual nodes in the network, to ensure that there is no anomaly. In this manner, the optical switch 27a is switched after the alarm information on the network is collected to ascertain that the network as a whole is in a state permitting the switchover, whereby deterioration in the transmission quality can be prevented (the problem mentioned in the latter half of paragraph 3 can be solved).

If it is concluded based on the alarm information that the switchover from the ILA to the OADM configuration can be executed, the supervisory controller 21 causes the OSC 28 to notify the individual nodes in the network that the switchover is to be executed. Since the individual nodes are previously notified of the switchover of configuration, the nodes can prepare for changes in the ASE level and the disconnection detection threshold, making it possible to prevent deterioration in the transmission quality of the signal beam. Further, the individual nodes can prepare for a momentary interruption of the signal beam caused by the switchover of configuration, thus making it possible to prevent erroneous operation of the OUPSR or span switch as well as erroneous generation of the disconnection alarm (the problems mentioned in paragraphs 1, 2, 5 and 6 can be solved).

After switching the optical switch 27a, the supervisory controller 21 collects alarm information from the local and other nodes and, if anomaly is found, switches the optical switch 27a back to its initial state. Thus, when anomaly is detected after the switchover of the optical switch 27a, the optical switch 27a is returned to its initial state, whereby signal degradation after the switchover of the optical switch 27a can be prevented.

The switchover from the ILA to the OADM configuration will be now described in detail with reference to the sequence diagrams of FIGS. 6 and 7. The figures illustrate a sequence of operations of the supervisory control terminal 31, ILA-OADM switching node 11, and ILA and OADM nodes which constitute the network together with the ILA-OADM switching node 11.

The ILA-OADM switching node 11 is operating normally (signal beam is transmitted) in the ILA configuration mode (Step S1b), and also the ILA and OADM nodes are operating normally (Step S1c).

In order to switch the ILA-OADM switching node 11 to the OADM configuration, the supervisory control terminal 31 outputs a switchover request to the ILA-OADM switching node 11 (Step S1a). At this stage, the ILA-OADM switching node 11 is already equipped with the add/drop unit 26.

The ILA-OADM switching node 11 receives the switchover request from the supervisory control terminal 31 (Step S2*b*).

On receiving the switchover request from the supervisory control terminal 31, the ILA-OADM switching node 11 requests each of the ILA and OADM nodes to collect alarm information (Step S3*b*).

In response to the alarm information collection request received from the ILA-OADM switching node 11, each of the ILA and OADM nodes checks for alarms (Step S2*c*). For example, each of the ILA and OADM nodes determines whether or not any of the following alarms is generated: a failure alarm indicating failure of the local optical amplifiers, add/drop unit (in the case of the OADM node), etc.; an alarm indicating detachment of optical fibers etc.; an alarm indicating signal degradation (e.g., in terms of BER; Bit Error Rate) etc. caused in the transceiver (in the case of the OADM node); and an alarm indicating that the wavelength count information received from the upstream node disagrees with the wavelength count information obtained by the add/drop unit.

Instead of using the switchover request from the supervisory controller 21 as a trigger to initiate collection of alarms from the individual nodes, the ILA and OADM nodes may each be configured to always send alarm information to the ILA-OADM switching node 11.

The ILA-OADM switching node 11 checks for its own alarms (Step S4*b*). For example, the ILA-OADM switching node 11 determines whether the add/drop unit 26 is properly connected or not based on the optical level detected by the photodiode 27*d*, and also determines whether or not an alarm indicating detachment of any of the optical fibers in the node is generated.

Also, the ILA-OADM switching node 11 checks for an alarm indicating failure of any of the add/drop unit 26, the preamplifier 24, and the post-amplifier 27.

Further, with the same number of wavelengths as that in the ILA configuration mode set in the add/drop unit 26 and also with all channels set in a through state (no signal is added/dropped), the optical level of the signal beam input to the photodiode (PD) 27*b* is monitored. Then, the difference between the optical level input to the post-amplifier 27 in the ILA configuration mode and the optical level of the output of the add/drop unit 26, detected by the photodiode 27*b*, is checked to ascertain that the difference is not greater than a fixed value. Alternatively, an input optical level per wavelength is calculated from the wavelength count, received from the supervisory control terminal 31, and the optical level detected by the photodiode 27*b*, to ascertain that the input optical level falls within a prescribed range.

Also, the ILA-OADM switching node 11 checks to see if the wavelength count information received from the upstream node or the supervisory control terminal 31 disagrees with the number of wavelengths measured based on the optical levels detected by the photodiodes 45*a* to 45*n* of the add/drop unit 26.

Although not shown, a photodiode for performing control actions such as AGC and ALC is provided at the input of the post-amplifier 27. This photodiode may therefore be used to measure the aforementioned optical level input to the post-amplifier 27 in the ILA configuration mode. Also, the supervisory controller 21 may obtain in advance a loss caused by the optical switch 27*a* so that the optical level detected by the photodiode 27*b* can be converted into the optical level at the input of the optical amplifier 27*c*. For example, based on the loss caused between the port of the optical switch 27*a* connected to the optical path A1 and the port connected to the photodiode 27*b* and the loss caused between the port connected to the optical path A2 and the port connected to the optical amplifier 27*c*, the optical level detected by the photodiode 27*b* is converted into the optical level at the input of the optical amplifier 27*c*.

The ILA-OADM switching node 11 determines whether or not any alarm is reported from the local and other nodes (Step S5*b*). If an alarm is reported from any of the local and other nodes, the ILA-OADM switching node notifies the supervisory control terminal 31 that switchover from the ILA to the OADM configuration is not executable (Step S2*a*). In this case, the ILA-OADM switching node 11 does not execute switchover from the ILA to the OADM configuration.

If no alarm is reported from any of the local and other nodes, the ILA-OADM switching node 11 prepares for the switchover of its own and also sends a switchover preparation request to the other nodes (Step S6*b*).

The ILA-OADM switching node 11 performs predetermined control actions in preparation for the switchover of the optical switch 27*a* (Step S7*b*). For example, the control mode of the optical amplifiers (AMP) 24*a* and 27*c* is switched from ALC to AGC, in order to allow the amplifying operation of the optical amplifiers 24*a* and 27*c* to quickly follow up a change of wavelengths caused at the time of switchover of the optical switch 27*a*. This also serves to reduce surge. Further, a signal interruption alarm is masked so as not to be output in response to the switchover of the optical switch 27*a*.

On receiving the switchover preparation request generated in Step S6*b*, each of the ILA and OADM nodes performs predetermined control actions (Step S3*c*). For example, the control mode of the optical amplifiers is switched from ALC to AGC. Also, the signal interruption alarm is masked so as not to be output in response to the switchover of the optical switch 27*a*. Further, the OUPSR or the span switch (SW) is controlled so as not to operate in response to a temporary interruption of the input signal beam.

For example, a protection time (time over which the OUPSR or the span switch is kept from switching) longer than the time required for the switchover from the ILA to the OADM configuration is set with respect to the OUPSR or the span switch, and if the interruption of the input signal beam continues for a time longer than the protection time, the OUPSR or the span switch is switched to the redundant side. Where the time of switchover from the ILA to the OADM configuration is 50 msec, for example, the protection time is set to 100 msec.

The ILA-OADM switching node 11 ascertains that the preparation for the switchover of the optical switch 27*a* is complete (Step S8*b*). Each of the ILA and OADM nodes notifies the ILA-OADM switching node 11 that the preparation for the switchover of the optical switch 27*a* has been completed (Step S4*c*).

After Steps S8*b* and S4*c* are executed, the ILA-OADM switching node 11 recognizes that the preparations are complete, and thus switches the optical switch 27*a* (Step S9*b*). Specifically, the optical switch 27*a* is switched such that the signal beams from the optical paths A1 and A2 are output to the optical amplifier 27*c* and the photodiode 27*b*, respectively.

The ILA-OADM switching node 11 checks the status subsequent to the switchover of the optical switch 27*a* (Step S10*b*). For example, it is ascertained that the optical level at the input side of the optical amplifier 27*c* is not higher than a prescribed level. If the optical level is higher than the prescribed level, the ILA-OADM switching node 11 generates an alarm.

Each of the ILA and OADM nodes checks the status subsequent to the switchover of the optical switch 27*a* (Step S5*c*).

For example, it is determined whether or not the signal beam level at the input side of each of the optical amplifier, the add/drop unit, etc. is at a predetermined level. It is also determined whether or not signal degradation (e.g., in terms of BER) is caused in the transceiver. If the optical level is not at the predetermined level or if signal degradation is caused in the transceiver, the corresponding ILA or OADM node generates an alarm.

The ILA-OADM switching node 11 determines whether or not an alarm is reported from any of the local and other ILA and OADM nodes (Step S11b).

If an alarm is reported from any of the local and other ILA and OADM nodes, the ILA-OADM switching node 11 returns the optical switch 27a to its original state (Step S12b). Specifically, the optical switch 27a is switched such that the signal beam from the optical path A2 is output to the optical amplifier 27c while the signal beam from the optical path A1 is output to the photodiode 27b.

The ILA-OADM switching node 11 sends a normal operation restoration request to each of the ILA and OADM nodes (Step S13b).

Subsequently, the ILA-OADM switching node 11 performs control actions to resume its normal operating state (Step S14b). For example, the control mode of the optical amplifiers 24a and 27c is switched back to ALC. Also, the alarm masking is canceled so that alarms can be output in case of anomaly. Consequently, the ILA-OADM switching node 11 is restored to its normal operating state (Step S15b).

In response to the normal operation restoration request generated in Step S13b, the ILA and OADM nodes resume their normal operating state (Step S6c). For example, the control mode of the optical amplifiers is switched back to ALC. Also, the alarm masking is canceled so that alarms can be output in case of anomaly. Further, the protection of the OUPSR or span switch is canceled so that switching to the redundant side may take place when signal interruption occurs. Consequently, the ILA and OADM nodes are restored to their normal operating state (Step S7c).

In this manner, the ILA-OADM switching node 11 collects alarm information from the local and other ILA and OADM nodes before carrying out the switchover of configuration. Also, when the switchover is to be executed, the ILA and OADM nodes are previously notified of the switchover, whereby deterioration in the transmission quality of the signal beam can be prevented.

The following describes the case where the number of wavelengths changes at the time of switchover from the ILA to the OADM configuration. When the ILA-OADM switching node 11 is to be switched from the ILA to the OADM configuration, the add/drop unit 26 should be set in the manner explained above with reference to FIGS. 6 and 7, in order to prevent the signal quality from being deteriorated due to a sudden change in the optical level of the signal beam. Specifically, the wavelengths of all channels should be set in the through state so that a change in the number of wavelengths may be unseen from the downstream side. However, in cases where signal degradation to some extent is permissible or signal beams should desirably be added/dropped from the outset, the method explained below may be used. With the method, deterioration in transmission quality can be lessened when the node is switched from the ILA to the OADM configuration with signal beams added/dropped.

Figure 7:
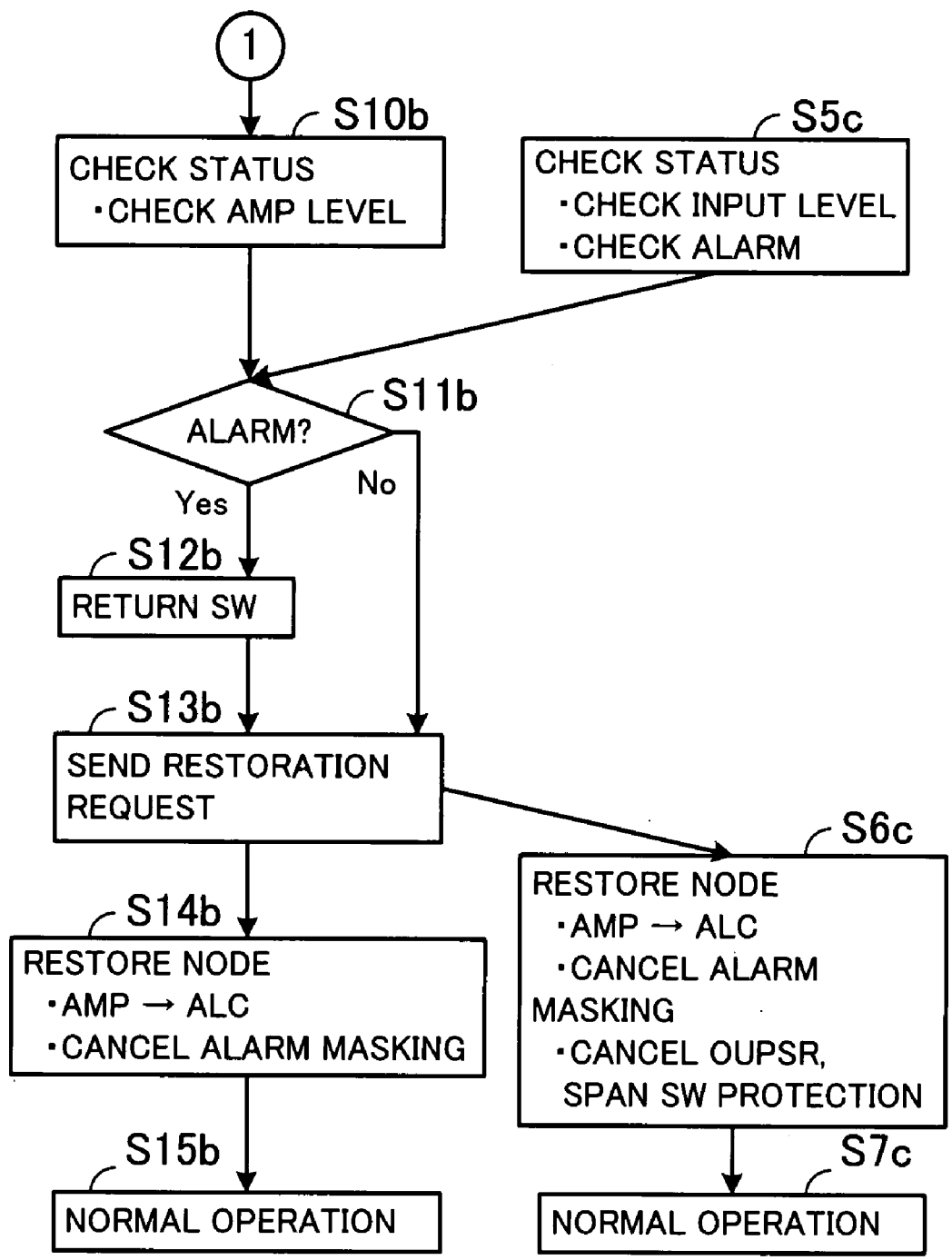
FIG. 7 is a sequence diagram also illustrating the switchover from the ILA to the OADM configuration.
Figure 8:
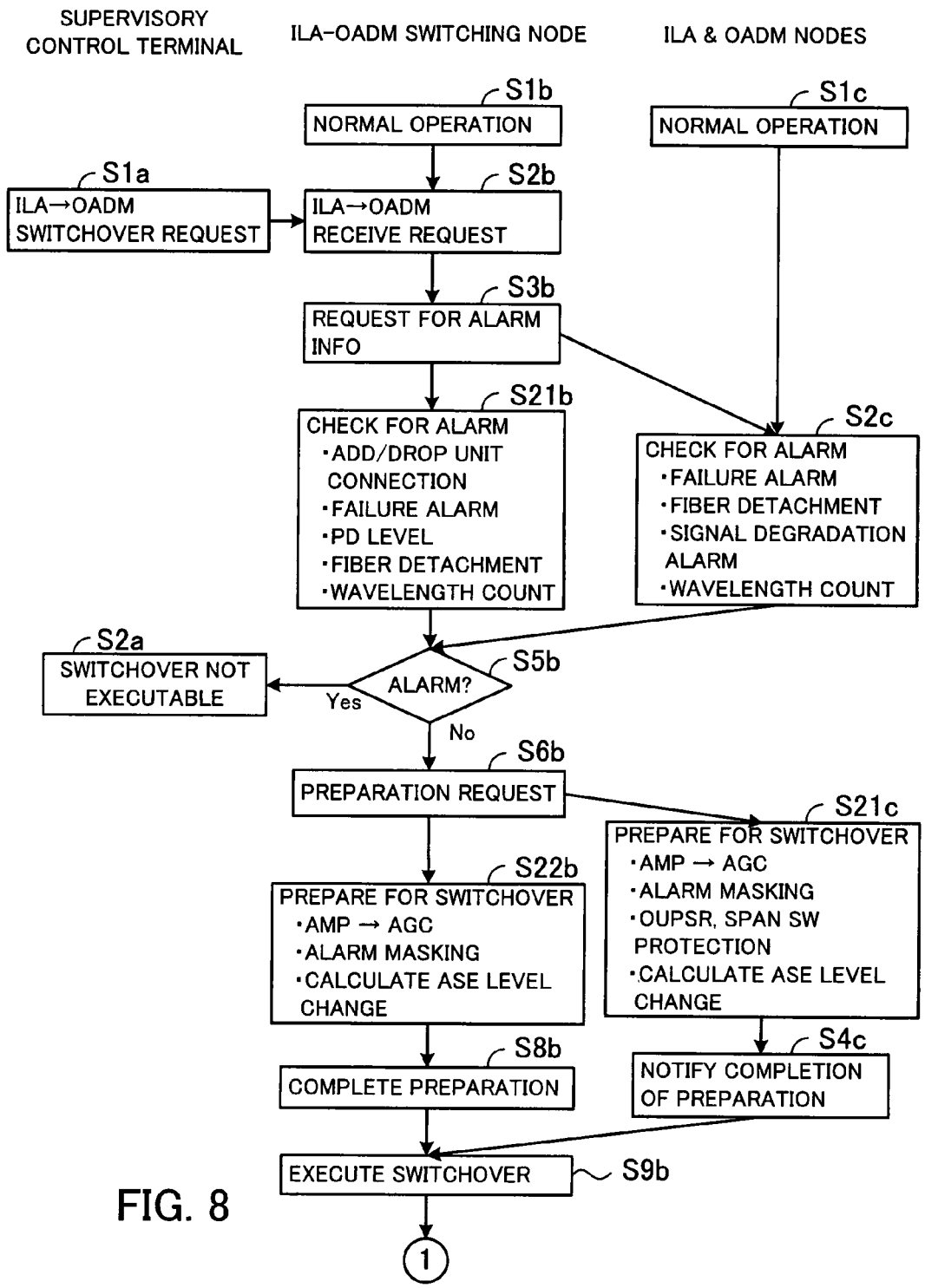
FIG. 8 is a sequence diagram illustrating how the switchover from the ILA to the OADM configuration is executed with a signal beam added/dropped by the add/drop unit.
Figure 9:
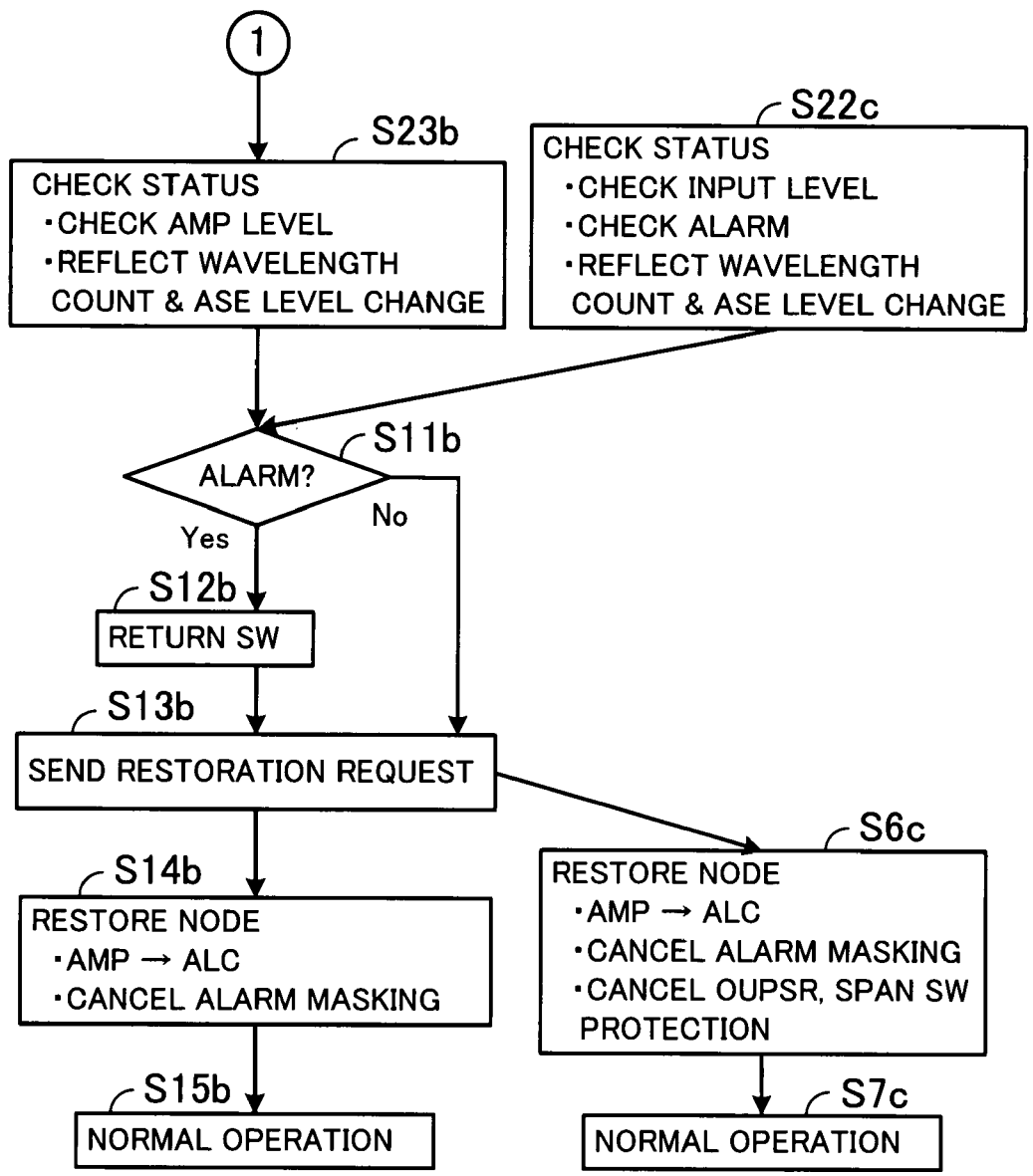
FIG. 9 is a sequence diagram also illustrating how the switchover from the ILA to the OADM configuration is executed with a signal beam added/dropped by the add/drop unit.

FIGS. 8 and 9 are sequence diagrams illustrating how the switchover from the ILA to the OADM configuration is performed with signal beams added/dropped by the add/drop unit. In FIGS. 8 and 9, like step numbers are used to denote like steps shown in FIGS. 6 and 7, and description of such steps is omitted.

Figure 6:
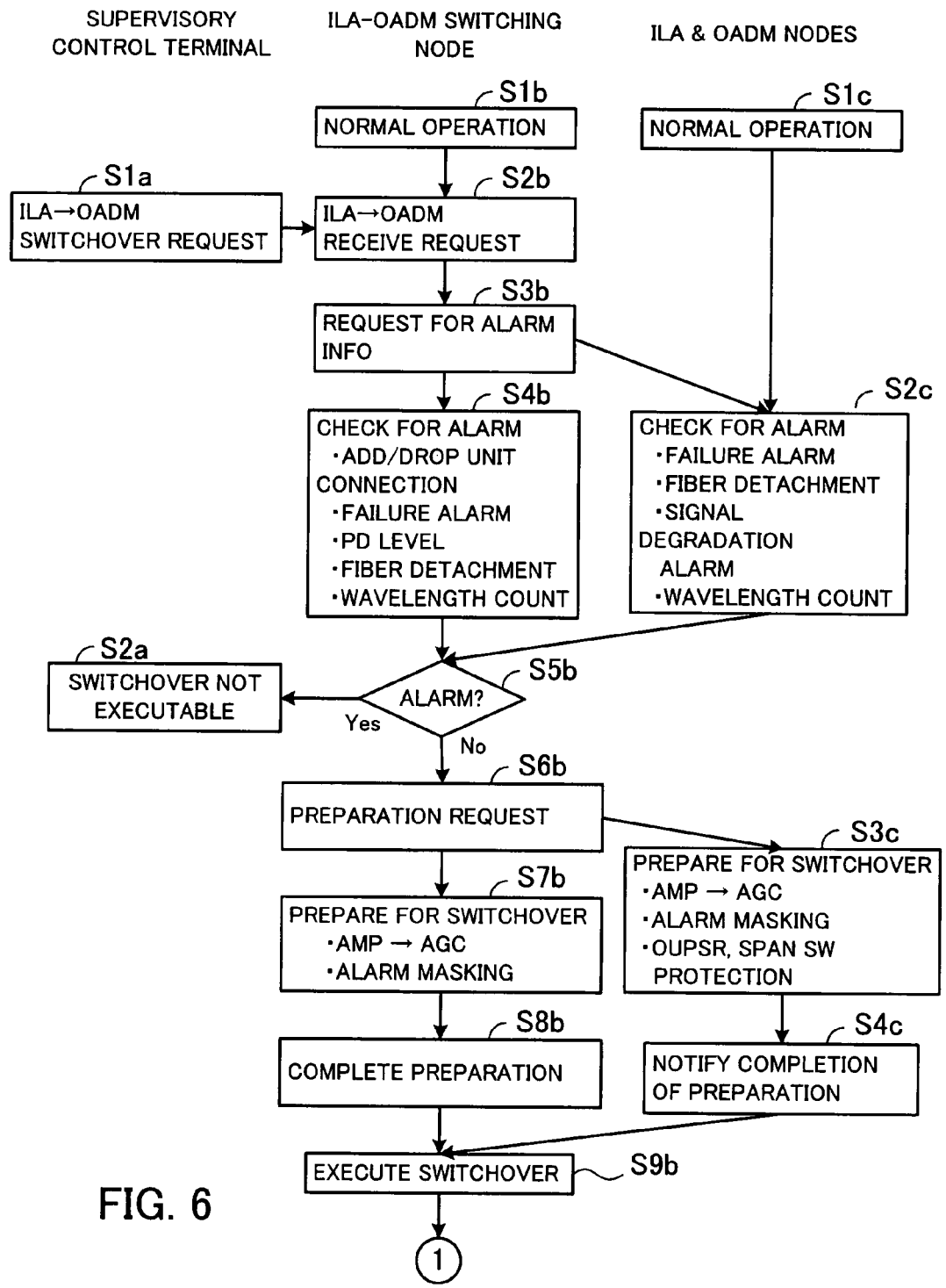
FIG. 6 is a sequence diagram illustrating switchover from ILA to OADM configuration.

When switchover from the ILA to the OADM configuration is to be performed with signal beams added/dropped by the add/drop unit 26, the ILA-OADM switching node 11 executes Step S21b, instead of Step S4b shown in FIG. 6. To confirm whether signal beams can be properly added/dropped, the ILA-OADM switching node 11 determines whether or not an alarm indicating failure of the transceiver 25 is generated, besides the alarm indicating failure of the add/drop unit 26, the preamplifier 24, and the post-amplifier 27.

Also, since signal beams are added/dropped by the add/drop unit 26, the number of wavelengths after the switchover from the ILA to the OADM configuration differs from that before the switchover; therefore, it is not appropriate that the optical level measured in the ILA configuration mode be simply compared with the optical level detected by the photodiode 27b (optical level output from the add/drop unit 26) prior to the switchover. Accordingly, the ILA-OADM switching node 11 divides the optical level output from the add/drop unit 26, detected by the photodiode 27c, by the number of wavelengths, to ascertain that the input level per wavelength is not higher than the prescribed level. Information about the number of wavelengths added/dropped by the add/drop unit 26 is acquired from the add/drop unit 26 by the supervisory controller 21. Alternatively, the information is acquired from the supervisory control terminal 31. The other operations executed in Step S21b are identical with those executed in Step S4b explained above with reference to FIGS. 6 and 7.

Further, the ILA-OADM switching node 11 executes Step S22b, instead of Step S7b shown in FIG. 6. The ILA-OADM switching node 11 previously acquires, from the add/drop unit 26 or the supervisory control terminal 31, the number of wavelengths after the switchover from the ILA to the OADM configuration, and calculates an amount of change of the ASE for that number of wavelengths. When the node is switched from the ILA to the OADM configuration, the ASE level is changed by the add/drop unit 26, as explained above with reference to FIGS. 5A and 5B. Thus, the supervisory controller 21 previously acquires the number of wavelengths and calculates a gain for the optical amplifier 27c appropriate to the ASE level change. The other operations executed in Step S22b are identical with those executed in Step S7b explained above with reference to FIGS. 6 and 7.

The ILA and OADM nodes each execute Step S21c, instead of Step S3c shown in FIG. 6. Each of the ILA and OADM nodes previously acquires, from the ILA-OADM switching node 11, the number of wavelengths after the switchover of the node 11 from the ILA to the OADM configuration, and calculates an amount of change of the ASE for that number of wavelengths. When the ILA-OADM switching node 11 is switched from the ILA to the OADM configuration, the ASE level is changed by the add/drop unit 26, as explained above with reference to FIGS. 5A and 5B. As a result, the ASE level changes also in the ILA and OADM nodes located downstream. Thus, each of the ILA and OADM nodes previously acquires the number of wavelengths and calculates an amount of change of the ASE level as well as a gain for the optical amplifier appropriate to the ASE level change. A new disconnection detection threshold is also calculated. The other operations executed in Step S21c are identical with those executed in Step S3c explained above with reference to FIGS. 6 and 7.

The ILA-OADM switching node 11 executes Step S23b, instead of Step S10b shown in FIG. 7. When checking the status subsequent to the switchover of the optical switch 27a, the ILA-OADM switching node 11 sets the gain, which reflects the number of wavelengths after the switchover and the ASE level change calculated in Step S22b, with respect to the optical amplifier 27c. The other operations executed in Step S23b are identical with those executed in Step S10b explained above with reference to FIGS. 6 and 7.

The ILA and OADM nodes each execute Step S22c, instead of Step S5c shown in FIG. 7. When checking the status subsequent to the switchover of the optical switch 27a, each of the ILA and OADM nodes sets the gain, which reflects the number of wavelengths after the switchover and the ASE level change calculated in Step S21c, with respect to the optical amplifier. Also, the new disconnection detection threshold is set. The other operations executed in Step S22c are identical with those executed in Step S5c explained above with reference to FIGS. 6 and 7.

In this manner, when the node is switched from the ILA to the OADM configuration, the number of wavelengths is acquired in advance of the switchover to calculate an amount of change of the ASE level, whereby the control of the optical amplifier can be started earlier than in the case where the number of wavelengths is successively acquired from the upstream nodes and the ASE level change is calculated so as to be reflected in the control of the optical amplifier. It is therefore possible to shorten the time over which signal degradation is caused.

The following describes the manner of how the add/drop unit 26 is detached. Where a number of communication lines fall into disuse, for example, the node may be switched from the OADM to the ILA configuration.

Figure 10:
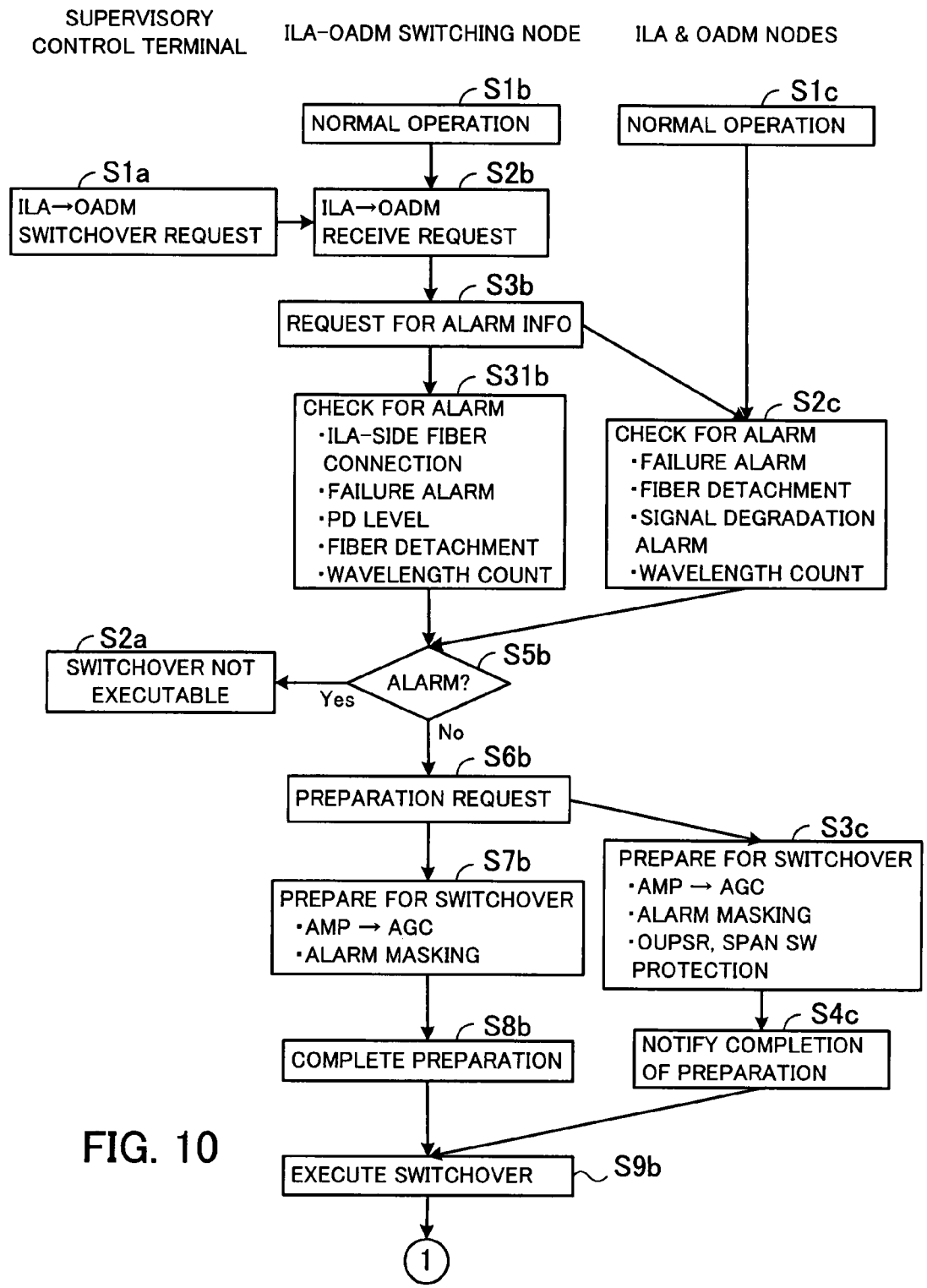
FIG. 10 is a sequence diagram illustrating switchover from the OADM to the ILA configuration.
Figure 11:
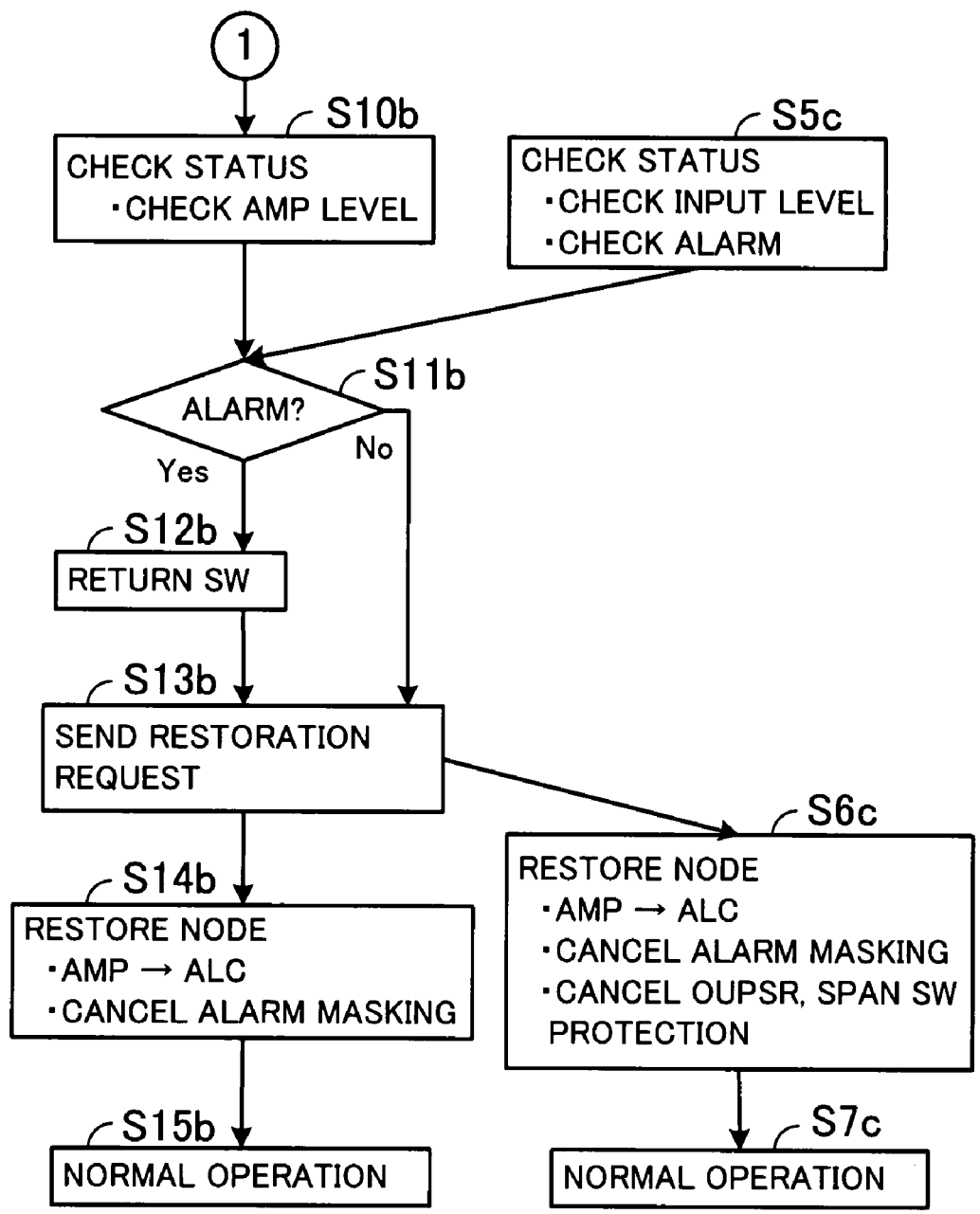
FIG. 11 is a sequence diagram also illustrating the switchover from the OADM to the ILA configuration.

FIGS. 10 and 11 are sequence diagrams illustrating switchover from the OADM to the ILA configuration. In FIGS. 10 and 11, like step numbers are used to denote like steps shown in FIGS. 6 and 7, and description of such steps is omitted.

In the case of the switchover from the OADM to the ILA configuration, a problem arises if the fiber constituting the optical path A2 is not properly connected. Accordingly, the ILA-OADM switching node 11 determines in Step S31b whether or not the ILA-side fiber (fiber constituting the optical path A2) is properly connected.

Also, the ILA-OADM switching node 11 determines whether the optical level output from the ILA side is proper or not. For example, an optical level per wavelength is calculated from the wavelength count acquired from the supervisory control terminal 31 and the optical level of the optical path A2 detected by the photodiode 27b, to determine whether or not the optical level output from the optical path A2 is proper.

The other steps are identical with those explained above with reference to FIGS. 6 and 7. Accordingly, collection of the alarm information from the other nodes and the alarm masking are carried out in preparation for a momentary interruption of the signal beam caused at the time of switchover from the OADM to the ILA configuration.

Thus, also in cases where the node is switched from the OADM to the ILA configuration because of disuse of communication lines, for example, deterioration in the transmission quality can be prevented.

In the optical transmission device of the present invention, alarm information is collected from the local and other optical transmission devices, and the switch is switched in accordance with the collected alarm information. Deterioration in the transmission quality can therefore be prevented.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission device for transmitting a wavelength-multiplexed optical signal, comprising:
   a first optical path;
   a second optical path in which an add/drop unit for adding/dropping a wavelength-multiplexed optical signal is removable;
   a splitter for splitting a wavelength-multiplexed optical signal received from a transmission path and outputting the split optical signals to the first and second optical paths, respectively;
   a switch for selecting one of the wavelength-multiplexed optical signals received from the first and second optical paths, and outputting the selected wavelength-multiplexed optical signal to an optical amplifier; and
   a supervisory controller for collecting alarm information from the optical transmission device or in a different optical transmission device, and controlling the switch in accordance with the alarm information such that the wavelength-multiplexed optical signal from the second optical path is input to the optical amplifier.

2. The optical transmission device according to claim 1, wherein, if the alarm information is received after the switch is controlled such that the wavelength-multiplexed optical signal from the second optical path is input to the optical amplifier, the supervisory controller controls the switch such that the wavelength-multiplexed optical signal from the first optical path is input to the optical amplifier.

3. The optical transmission device according to claim 1, wherein, when controlling the switch such that the wavelength-multiplexed optical signal from the second optical path is input to the optical amplifier, the supervisory controller transmits, to the different optical transmission device, switchover information indicating switchover of the optical paths.

4. The optical transmission device according to claim 3, wherein, when the switchover information is received, the different optical transmission device masks output of the alarm information.

5. The optical transmission device according to claim 4, wherein the supervisory controller transmits, to the different optical transmission device, control completion information indicating that control of the switch is completed, and
   when the control completion information is received, the different optical transmission device cancels the masking of the alarm information.

6. The optical transmission device according to claim 3, wherein the different optical transmission device has an OUPSR function and, on receiving the switchover information, does not cause the optical unidirectional path switched ring (OUPSR) to perform redundancy switching.

7. The optical transmission device according to claim 6, wherein, if a signal interruption continues for a time longer than an expected interruption time over which the wavelength-multiplexed optical signal is expectedly interrupted by the switch, the different optical transmission device causes the OUPSR to perform redundancy switching.

8. The optical transmission device according to claim 3, wherein the different optical transmission device has a span switch function and, on receiving the switchover information, does not cause the span switch to perform switching.

9. The optical transmission device according to claim 1, wherein the switch is a 2×2 switch having inputs connected to the first and second optical paths, respectively, and having outputs respectively connected to the optical amplifier and an optical level detector for detecting an optical level of the wavelength-multiplexed optical signal.

10. The optical transmission device according to claim 9, wherein the supervisory controller detects the optical level of an output of the add/drop unit inserted in the second optical path by controlling the 2×2 switch such that the second optical path is connected to the optical level detector, and controls switchover of the 2×2 switch in accordance with the detected optical level and the alarm information such that the second optical path is connected to the optical amplifier.

11. The optical transmission device according to claim 9, wherein, if a difference between the optical level of the wavelength-multiplexed optical signal input to the optical amplifier and the optical level of an output of the add/drop unit detected by the optical level detector is smaller than a predetermined value, the supervisory controller controls switchover of the 2×2 switch such that the second optical path is connected to the optical amplifier.

12. The optical transmission device according to claim 11, wherein the supervisory controller measures in advance a loss caused by the 2×2 switch, and has the measured loss reflected in the optical level of the output of the add/drop unit detected by the optical level detector.

13. The optical transmission device according to claim 9, wherein the supervisory controller calculates an optical level per wavelength from the number of wavelengths handled by the add/drop unit inserted in the second optical path, acquired from the add/drop unit or a supervisory control terminal, and the optical level of the add/drop unit detected by the optical level detector.

14. The optical transmission device according to claim 9, wherein, if, after the 2×2 switch is controlled such that the second optical path is connected to the optical amplifier, the 2×2 switch should be returned to a state such that the first optical path is connected to the optical amplifier, the supervisory controller calculates an optical level per wavelength from the number of wavelengths acquired from a supervisory control terminal and the optical level of the wavelength-multiplexed optical signal from the first optical path detected by the optical level detector.

15. The optical transmission device according to claim 1, wherein, if wavelength count information received from the different optical transmission device or a supervisory control terminal disagrees with that acquired from the add/drop unit, the supervisory controller controls the switch such that the wavelength-multiplexed optical signal from the first optical path is input to the optical amplifier.

16. The optical transmission device according to claim 1, wherein the supervisory controller calculates an optical level per wavelength from an optical level of an output of the add/drop unit and wavelength count information received from a supervisory control terminal and, if the calculated optical level is at a predetermined level, controls the switch such that the wavelength-multiplexed optical signal from the second optical path is input to the optical amplifier.

17. The optical transmission device according to claim 1, wherein the supervisory controller collects signal degradation information about signal degradation caused in an add/drop unit of the different optical transmission device, and controls the switch in accordance with the signal degradation information such that the wavelength-multiplexed optical signal from the second optical path is input to the optical amplifier.

18. The optical transmission device according to claim 1, wherein the optical amplifier performs automatic level control and automatic gain control, and
when controlling the switch such that the wavelength-multiplexed optical signal from the second optical path is input to the optical amplifier, the supervisory controller switches control mode of the optical amplifier from the automatic level control to the automatic gain control.

19. The optical transmission device according to claim 1, wherein the supervisory controller acquires, from the add/drop unit or a supervisory control terminal, the number of wavelengths after switchover control of the switch, and transmits the acquired number of wavelengths to the different optical transmission device.

20. The optical transmission device according to claim 19, wherein the optical transmission device and the different optical transmission device each include an ASE calculation for calculating an amount of change of amplified spontaneous emission (ASE) from the acquired number of wavelengths before the switch is switched.

* * * * *